United States Patent Office 2,745,835
Patented May 15, 1956

2,745,835

CONTINUOUS PROCESS FOR PRODUCTION OF ALKYL PYRIDINES

Charles E. Becker, Pasadena, Tex., assignor to Phillips Petroleum Company, a corporation of Delaware No Drawing. Application November 17, 1952,
Serial No. 321,043

8 Claims. (Cl. 260—290)

This invention in one aspect pertains to the production of alkyl pyridines. In another aspect the invention relates to the provision of a continuous process for the synthesis of 2-methyl-5-ethylpyridine.

It is known that alkyl pyridines can be produced by the interaction of acetaldehyde with ammonia in the presence of a suitable catalyst. However when acetaldehyde is used as a starting material for the synthesis of alkyl pyridines, particularly 2-methyl-5-ethylpyridine, a yield of less than fifty per cent is generally obtained. On the other hand, if the acetaldehyde is first converted to paraldehyde, a trimer of acetaldehyde, the yield of alkyl pyridines is generally at least seventy-five to eighty percent. When this method is employed the practice is to convert the acetaldehyde to paraldehyde in the presence of an acid catalyst such as sulfuric acid, neutralize the acid catalyst with an excess of an alkali metal carbonate or hydroxide, remove the unchanged acetaldehyde from the paraldehyde by distillation, and transfer the paraldehyde to a reactor where it is contacted with ammonia, in the presence of a suitable catalyst, under conditions such that alkyl pyridines are obtained. This method unfortunately involves the purchase of two catalysts and a method of separating unpolymerized acetaldehyde from paraldehyde.

I have now discovered a method whereby alkyl pyridines can be prepared from acetaldehyde with only one catalyst as the starting material, and without providing for the separation of unpolymerized acetaldehyde from paraldehyde. Moreover the process provided by the practice of this invention is readily adaptable to continuous as well as batch operation. In accordance with this invention alkyl pyridines, particularly 2-methyl-5-ethylpyridine, are produced by polymerizing acetaldehyde to paraldehyde in the presence of sufficient hydrogen halide to catalyze said polymerization, reacting ammonia with the resulting reaction mixture in an amount sufficient to convert said hydrogen halide catalyst to an ammonium halide, and in the presence of the thus formed ammonium halide as a catalyst reacting sufficient ammonia with said paraldehyde to form methylethylpyridine.

In the practice of an embodiment of this invention a continuous process for the production of alkyl pyridines is provided which includes the following integrated steps:

(1) Conversion of acetaldehyde to paraldehyde in a polymerization unit in the presence of a hydrogen halide as a catalyst; (2) Transfer of the reaction mixture from step 1 to a reactor for the production of alkyl pyridines, addition of excess ammonia to convert the hydrogen halide to an ammonium halide which serves to catalyze the reaction of ammonia with paraldehyde, and adjusting the temperature and pressure conditions to a level such that the ammonia present will react with the paraldehyde to produce alkyl pyridines; (3) Separation of the products of the reaction and recycling of unreacted ammonia to step 2 of the process.

In the first step of the process acetaldehyde is converted to paraldehyde in the presence of a hydrogen halide as a catalyst. It is generally the practice to charge a portion of paraldehyde to the reactor first, then introduce the catalyst, and finally add the acetaldehyde. This procedure affords a means of controlling the temperature of the polymerization reaction. Hydrogen halides which are applicable are hydrogen fluoride, hydrogen chloride, and hydrogen bromide, with hydrogen fluoride generally being the preferred species. It is generally preferred to use the hydrogen halide in substantially anhydrous form. If desired, however, hydrogen halides can be used in aqueous medium. When aqueous solutions are employed, they generally contain at least 30 per cent by weight of the hydrogen halide.

The amount of catalyst charged is usually in the range from 0.1 to 6, preferably 0.5 to 3, weight per cent based upon the total aldehyde (acetaldehyde and paraldehyde) charged. This amount of catalyst is sufficient for effecting the pyridine synthesis step (step 2) of the process. The conversion of acetaldehyde to paraldehyde is generally effected at temperatures in the range between 30 and 110° F., preferably at temperatures below 75° F. Acetaldehyde-paraldehyde equilibrium mixtures are formed in the presence of acid catalysts with larger amounts of paraldehyde being present at the lower temperatures. It is ordinarily preferred that the aldehyde mixtures employed contain a large proportion of paraldehyde since higher yields of alkyl pyridines are generally obtained when operating in this manner. The following table shows the results of a study of acetaldehyde-paraldehyde equilibrium mixtures in the presence of sulfuric acid at temperatures ranging from 40 to 110 F.:

TABLE I

| Temperature, °F. | Wt. per cent paraldehyde |
|---|---|
| 40 | 96.2 |
| 45 | 95.5 |
| 50 | 94.8 |
| 55 | 94.2 |
| 60 | 93.3 |
| 65 | 92.4 |
| 70 | 91.3 |
| 72 | 90.8 |
| 74 | 90.3 |
| 76 | 89.8 |
| 78 | 89.3 |
| 80 | 88.6 |
| 82 | 88.0 |
| 84 | 87.4 |
| 86 | 86.7 |
| 88 | 85.9 |
| 90 | 85.2 |
| 92 | 84.4 |
| 94 | 83.6 |
| 96 | 82.7 |
| 98 | 81.8 |
| 100 | 80.8 |
| 102 | 80.0 |
| 104 | 79.1 |
| 106 | 78.1 |
| 108 | 77.1 |
| 110 | 75.8 |

The residence time in the polymerization unit will vary depending upon the temperature used. It is intended that sufficient time be allowed for equilibrium between the paraldehyde and acetaldehyde to be reached at the temperature employed. In general, the residence time will be in the range between 10 minutes and 5 hours and usually it is not more than three hours.

The reaction mixture from the polymerization step is transferred to a reactor where the synthesis of alkyl pyridines is effected. The reactor is provided with an agitating means. Air is removed from the reactor by means of nitrogen or other inert gas. Excess ammonia is introduced, in aqueous solution or liquid phase, which converts the hydrogen halide present to an ammonium halide. The ammonium halide serves as the catalyst for the alkyl pyridine synthesis. Sufficient ammonia is introduced to neutralize the hydrogen halide present and to have an amount remaining such that the mol ratio of ammonia to acetaldehyde (total aldehyde charged in step 1 calculated as acetaldehyde) is in the range between 1:1 and 12:1, preferably in the range between 2:1 and 9:1. The ammonia for the reaction is usually employed in aqueous solution in concentrations ranging from 10 to 90 weight per cent ammonia. Anhydrous liquid ammonia can also be used if desired. Optimum reaction temperatures for the alkyl pyridine synthesis step are within the range from 300 to 650° F., preferably 450 to 550° F. The reaction is usually effected in the liquid phase and, consequently, pressures at least sufficient to maintain the reaction mixture in liquid phase are employed. When operating with a closed pressure reactor, the autogenous pressures developed by the reaction mixture at the reaction mixture at the reaction temperature are satisfactory. These pressures are usually within the range from 850 to 2500 pounds per square inch gauge. The reaction period, or residence time in the reactor, is generally in the range from five minutes to five hours, preferably no longer than two hours.

At the end of the reaction period in step 2, the products are separated by any means desired. One method comprises transferring the effluent to a stripping zone where unreacted ammonia is removed and recycled to step 2. The remaining material is mixed with benzene or other suitable solvent to extract any organic material which is dissolved in the aqueous phase. The mixture is then transferred to a settling zone where the organic and aqueous phases are separated. Any water present in the organic phase is taken overhead as a water-benzene azeotrope during removal of the benzene and the alkyl pyridines are then separated by fractional distillation. Any other methods which can be employed for separation and recovery of the products are considered within the scope of the invention.

To illustrate the practice of the invention and the desirable results to be obtained thereby reference is now had to specific examples.

Example I 2-methyl-5-ethylpyridine is produced by charging paraldehyde to a polymerization unit, adding anhydrous hydrogen fluoride, adjusting the temperature to 40° F., and then introducing acetaldehyde slowly while the mixture is stirred. After addition of the acetaldehyde, stirring is continued for 1.5 hours while maintaining the temperature at 40° F. The reaction mixture is then transferred to a pressure reactor where the synthesis of 2-methyl-5-ethylpyridine is effected. Air is swept out of the reactor with nitrogen, sodium hexametaphosphate is introduced, and finally ammonia in the form of an aqueous solution is added. The reactor is closed and the temperature raised to the desired level. Agitation of the reactor is effected by an electrically driven platform rocker. At the end of the reaction period the mixture is transferred to an ammonia stripper where the ammonia is removed. Benzene is added to extract pyridine bases from the aqueous phase, the aqueous and organic phases are separated, water is distilled along with the benzene as a water-benzene azeotrope, and 2-methyl-5-ethylpyridine is separated by fractional distillation. The following table shows the amounts of materials, reaction conditions, and yield of 2-methyl-5-ethylpyridine.

Catalyst:
  Hydrogen fluoride, grams ___ 0.7
  Sodium hexametaphosphate, grams ___ 1.0
Paraldehyde, grams ___ 68
Acetaldehyde, grams ___ 102
Total aldehyde charged, grams ___ 170
Mols aldehyde, calculated as acetaldehyde ___ 3.86
Mols aldehyde, calculated as paraldehyde ___ 1.29
Ammonia, grams ___ 180
Ammonia, mols ___ 10.59
Water, grams ___ 211
Grams NH₃/100 grams water ___ 82.3
Residence time in polymerization unit, hours ___ 1.5
Temperature in polymerization unit, ° F ___ 40
Residence time in pyridine synthesis reactor, hours ___ 0.5
Temperature in pyridine synthesis reactor, ° F ___ 490–500
Per pass yield of 2-methyl-5-ethylpyridine (mol per cent of theoretical based on total aldehyde charged) ___ 75

Example II

Anhydrous hydrogen fluoride was employed as a catalyst for the production of paraldehyde from acetaldehyde. A charge containing both paraldehyde and acetaldehyde was weighed into a reactor provided with a stirring means. Hydrogen fluoride was introduced, the mixture was agitated, and the temperature increased to the desired level. Temperatures and pressures were observed at intervals of one, five, ten, thirty, and sixty minutes in order to follow the course of the reaction. The following table shows the initial charge and the conversions at the several intervals.

|  | I | II |
|---|---|---|
| Initial charge, wt. percent: |  |  |
|   Paraldehyde | 69.8 | 69.1 |
|   Acetaldehyde | 30.2 | 30.9 |
| HF Added, wt. percent | 1.07 | 0.44 |
| Pot Temperature, ° F.: |  |  |
|   Initial | 98 | 99 |
|   1 min | 104 | 102.5 |
|   5 min | 106 | 104.5 |
|   15 min | ᵃ 107 | 105 |
|   30 min | 105 | 106 |
|   60 min | 105 | ᵇ 105 |
| Acetaldehyde by Analysis, wt. percent: |  |  |
|   Initial | 28.7 | 29.4 |
|   1 min | 28.6 | 29.0 |
|   5 min | 26.9 | 28.4 |
|   15 min | 19.9 | 26.9 |
|   30 min | 18.4 | 23.5 |
|   60 min | 18.9 | 19.2 |

ᵃ 112 at 9 min.
ᵇ 107 from 32 to 39 min.

In some instances it may be found desirable to employ an emulsifying agent in the reaction mixture. It is preferred that any emulsifying agent so employed be soluble in at least one of the components of the reaction mixture. Emulsifying agents that can be used include salts of saturated or unsaturated fatty acids containing from six to 18 carbon atoms per molecule, sulfates such as lauryl sulfate, and sulfonates such as alkaryl sulfonates. Nonionic detergents such as ethylene oxide condensation products of organic acids, alcohols, mercaptans, phenols, amides, and the like, as well as cationic surface active agents of the quaternary ammonium ion type are also considered applicable.

In addition a small quantity of a phosphate glass of an alkali metal or alkaline earth metal, or a pyrophosphate of ammonia or alkali metal or alkaline earth metal, is frequently employed as additional catalyst for the reaction, synergist for the fluorine-containing catalyst, and/or corrosion inhibitor. These phosphates also often aid in working up the products by reducing emulsion formation. The amount employed is preferably from 0.05 to 10, and more preferably from 0.1 to 6, weight per cent based on the total aldehyde charged. Calcium phosphate glasses can be used, but I usually employ water soluble alkali metal phosphate glasses and prefer to use a water soluble sodium phosphate glass. Descriptions of these glasses and the methods of producing them are contained in the articles by Partridge, Chemical and Engineering News 27, 214–217 (1949) and by Schwartz et al., Industrial and Engineering Chemistry 34, 32–40 (1942). The metal phosphate glasses and particularly the sodium phosphate glasses, are readily prepared by heating the corresponding metal metaphosphate to a temperature above its melting point and rapidly cooling the resulting liquid to form a vitreous or glassy product. The glasses contain $P_2O_5$ and metallic oxides in varying amounts, and the ratio of $P_2O_5$ and metallic oxides extends over a wide range. More specifically, the glasses I employ can contain a minor, say 0.1 mol per cent, amount of metallic oxide, and the concentration of the metallic oxide may vary up to 60 mol per cent. The preferred glass is available commercially, and it is known as sodium hexametaphosphate. This preferred glass contains equimolar proportions of $Na_2O$ and $P_2O_5$.

It is seen that in accordance with the practice of this invention acetaldehyde is trimerized with a hydrogen halide as a catalyst. One advantage of this invention is that the hydrogen halide is then converted in situ to the ammonium halide which serves as the catalyst for the conversion of the acetaldehyde trimer to methylethylpyridine. Another advantage of this invention is that unconverted acetaldehyde is not separated from paraldehyde before reacting paraldehyde to form methylethylpyridine. To determine whether the presence of acetaldehyde was disastrous paraldehyde containing no acetaldehyde, and paraldehyde containing 2.1 weight per cent acetaldehyde were converted to alkyl pyridines using ammonia. Operating conditions and yields are given in the following table.

TABLE II

| | Paraldehyde Containing No Acetaldehyde | Paraldehyde Containing 2.1 Weight Percent Acetaldehyde |
|---|---|---|
| Weight $NH_3$ (grams) | 173 | 173 |
| Weight Paraldehyde (grams) | 170 | 170 |
| Weight $H_2O$ (grams) | 211 | 211 |
| $NH_4FHF$ (grams) | 2 | 2 |
| Sodium hexametaphosphate (grams) | 1 | 1 |
| Weight: | | |
| Picolines (grams) | 2.4 | 4.2 |
| MEP (grams) | 94.7 | 91.9 |
| HB Pyridines (grams) | 17.7 | 19.6 |
| Yield: | | |
| Picolines | 2.0 | 3.5 |
| MEP | 81.0 | 78.6 |
| HB Pyridines | 15.6 | 17.3 |
| Total | 98.6 | 99.4 |
| Time _____ hours | ½ | 3 |
| Temperature _____ °F | 480 | 500 |

It is noted that the yield was reduced from 81.0 per cent to 78.6 per cent when 2.1 per cent acetaldehyde was present in the paraldehyde feed stream. However this small difference quite likely was due to the difference in operating conditions of the two runs. Other advantages are of course apparent from the foregoing disclosure. The present invention in its broader aspects is therefore not limited to a particular process but embraces various of the variations which will find utility.

I claim:

1. A process for the production of an alkyl pyridine which comprises polymerizing acetaldehyde to paraldehyde in the presence of a hydrogen halide selected from the group consisting of hydrogen fluoride, hydrogen chloride and hydrogen bromide, said hydrogen halide being present in sufficient quantity to catalyze the polymerization, reacting ammonia with the resulting reaction mixture in an amount sufficient to convert said hydrogen halide catalyst to an ammonium halide, in the presence of the thus formed ammonium halide as a catalyst reacting sufficient ammonia with said paraldehyde to form methylethylpyridine, and recovering said methylethylpyridine.

2. A process for the production of methylethylpyridine which comprises trimerizing acetaldehyde in the presence of from 0.1 to 6 weight per cent hydrogen fluoride, based on total aldehyde present, to catalyze the trimerization reaction, converting said hydrogen fluoride to ammonium fluoride in situ by the addition of a stoichiometric excess of ammonia thereby forming a mixture comprising acetaldehyde trimer, ammonium fluoride and excess ammonia, converting said acetaldehyde trimer to methylethylpyridine by reaction with the excess ammonia in the presence of said ammonium fluoride as a catalyst and separating the resulting products.

3. A process for the production of 2-methyl-5-ethylpyridine which comprises polymerizing acetaldehyde to paraldehyde at a temperature of from 30° F. to 110° F. and in the presence of from 0.1 per cent to 6 per cent by weight based on the total aldehyde charged of a hydrogen halide catalyst selected from the group consisting of hydrogen fluoride, hydrogen chloride and hydrogen bromide, treating the resulting reaction mixture at a temperature of from 300° F. to 650° F. with sufficient ammonia to convert the hydrogen halide catalyst to an ammonium halide with an amount of ammonia in excess such that the mol ratio of ammonia to total aldehyde charged calculated as acetaldehyde is in the range between 1:1 and 12:1 sufficient to react with paraldehyde at said temperature and with said ammonium halide as the catalyst to convert the paraldehyde to 2-methyl-5-ethylpyridine, and separating the resulting products.

4. A process for the production of 2-methyl-5-ethylpyridine which comprises polymerizing acetaldehyde to paraldehyde at a temperature between 30° F. and 75° F. and in the presence of from 0.5 per cent to 3 per cent hydrogen chloride as a catalyst based on the total aldehyde charged, treating said reaction mixture with sufficient ammonia to convert the hydrogen chloride catalyst to ammonium chloride and provide a stoichiometric excess of ammonia, and a temperature of 450° F. to 550° F. reacting the resulting mixture containing the excess ammonia and said ammonium chloride as the catalyst in the presence of an emulsifier and a compound of the group consisting of ammonium, alkali metal and alkaline earth metal salts of a phosphate glass to convert the paraldehyde to 2-methyl-5-ethylpyridine, the mol ratio of ammonia to total aldehyde charged calculated as acetaldehyde being in the range between 2:1 and 9:1, and recovering the resulting products.

5. A process for the production of 2-methyl-5-ethylpyridine which comprises polymerizing acetaldehyde to paraldehyde at a temperature between 30° F. and 75° F. and in the presence of from 0.5 per cent to 3 per cent hydrogen bromide as a catalyst based on the total aldehyde charged, treating said reaction mixture with sufficient ammonia to convert the hydrogen bromide catalyst to ammonium bromide and provide a substantial stoichiometric excess of ammonia, at a temperature of 450° F. to 550° F. reacting the resulting mixture containing the excess ammonia and said ammonium bromide as the catalyst in the presence of sodium phosphate glass and an emulsifier to convert the paraldehyde to 2-methyl-5-ethylpyridine, the mol ratio of ammonia to total aldehyde charged calculated as acetaldehyde being in the range between 2:1 and 9:1, and recovering the resulting products.

6. A process for the production of 2-methyl-5-ethylpyridine which comprises polymerizing acetaldehyde to paraldehyde at a temperature between 30° F. and 75° F. and in the presence of from 0.5 per cent to 3 per cent hydrogen fluoride as a catalyst based on the total adlehyde charged, treating said reaction mixture with sufficient ammonia to convert the hydrogen fluoride catalyst to ammonium fluoride and provide an excess of ammonia, at a temperature of 450° F. to 550° F. reacting the resulting mixture containing the excess ammonia and said ammonium fluoride as the catalyst in the presence of calcium phosphate glass and an emulsifier to convert the paraldehyde to 2-methyl-5-ethylpyridine, the mol ratio of ammonia total aldehyde charged calculated as acetaldehyde being in the range between 2:1 and 9:1, and recovering the resulting products.

7. A process for the production of 2-methyl-5-ethylpyridine which comprises trimerizing acetaldehyde in the presence of from 0.1 to 6 weight per cent hydrogen fluoride, based on total aldehyde present, to catalyze the trimerization reaction, converting said hydrogen fluoride to ammonium fluoride in situ by the addition of a stoichiometric excess of ammonia to the reaction mixture, thereby forming a mixture comprising acetaldehyde trimer, ammonium fluoride and excess ammonia, subjecting the resulting mixture to temperature and pressure conditions suitable for converting said acetaldehyde trimer to 2-methyl-5-ethylpyridine by reaction with ammonia in the presence of said ammonium fluoride as a catalyst in said latter-mentioned mixture and recovering 2-methyl-5-ethylpyridine.

8. A process for the production of 2-methyl-5-ethylpyridine which comprises trimerizing acetaldehyde in the presence of a catalyst selected from the group consisting of hydrogen fluoride, hydrogen chloride and hydrogen bromide, said catalyst being present in sufficient quantity to catalyze the trimerization reaction, converting said hydrogen halide to ammonium halide in situ by the addition of stoichiometric excess of ammonia to the reaction mixture thereby forming a mixture comprising acetaldehyde trimer, ammonium halide and excess ammonia, subjecting said latter-mentioned mixture to temperature and pressure conditions suitable for converting said acetaldehyde trimer to 2-methyl-5-ethylpyridine by reaction with said excess ammonia in the presence of said ammonium halide as a catalyst and recovering 2-methyl-5-ethylpyridine.

References Cited in the file of this patent

UNITED STATES PATENTS

| | | |
|---|---|---|
| 2,318,341 | Thompson | May 4, 1943 |
| 2,571,759 | Quinn et al. | Oct. 16, 1951 |
| 2,615,022 | Mahan | Oct. 21, 1952 |

FOREIGN PATENTS

| | | |
|---|---|---|
| 147,000 | Great Britain | Mar. 17, 1921 |
| 488,595 | Canada | Dec. 2, 1952 |
| 521,891 | France | Mar. 16, 1921 |

OTHER REFERENCES

Maier-Bode: "Puridin und Seine Derivate," pp. 55–57 (1934).